United States Patent
Dannenberg

(10) Patent No.: US 9,601,241 B2
(45) Date of Patent: Mar. 21, 2017

(54) CABLE CLAMP

(71) Applicant: TYCO ELECTRONICS SERVICES GMBH, Schaffhausen (CH)

(72) Inventor: Patrick Paul Dannenberg, Brookvale (AU)

(73) Assignee: TYCO ELECTRONICS SERVICES GMBH (CH)

( * ) Notice: Subject to any disclaimer, the term of this patent is extended or adjusted under 35 U.S.C. 154(b) by 0 days.

(21) Appl. No.: 14/394,236

(22) PCT Filed: Apr. 16, 2013

(86) PCT No.: PCT/AU2013/000385
§ 371 (c)(1),
(2) Date: Oct. 13, 2014

(87) PCT Pub. No.: WO2013/155554
PCT Pub. Date: Oct. 24, 2013

(65) Prior Publication Data
US 2015/0083463 A1    Mar. 26, 2015

(30) Foreign Application Priority Data

Apr. 16, 2012 (AU) .............................. 2012202365
Aug. 24, 2012 (AU) .............................. 2012216533

(51) Int. Cl.
*H02G 3/32* (2006.01)
*H01B 17/24* (2006.01)
(52) U.S. Cl.
CPC .............. *H01B 17/24* (2013.01); *H02G 3/32* (2013.01)

(58) Field of Classification Search
CPC ........ H02G 7/053; H02G 15/22; H02G 15/20; H02G 15/02; H02G 15/06; H02G 7/08;
(Continued)

(56) References Cited

U.S. PATENT DOCUMENTS 2,355,742 A * 8/1944 Morehouse ........... F16L 3/2235
174/40 CC
2,473,264 A * 6/1949 Stevens ................. F16L 3/1091
174/157

(Continued)

OTHER PUBLICATIONS

PCT Search Report and Written Opinion for PCT/AU2013/000385, completed Jul. 10, 2013.
Ellis Patents "Electrical Product Catalogue", 2003.

*Primary Examiner* — Angel R Estrada
*Assistant Examiner* — Pete Lee
(74) *Attorney, Agent, or Firm* — Barnes & Thornburg LLP

(57) ABSTRACT

A cable clamping unit for clamping an electrical cable including first and second mating units for clamping around the cable, each of the mating units including a soft sleeve for engaging the cable, the sleeves being at least semi permanently attached to a corresponding mating unit. A cable clamp includes a busbar securing portion for securing the cable clamp to a busbar, a first mating unit including a first cable locating formation, at least two securing nuts, each including a threaded portion for engaging a respective attachment bolts and also engaging at least two respective securing bolts, and a second mating unit including a second cable locating formation and adapted to engage the first mating unit thereby to securely clamp an electrical cable located between respective first and second locating formations of the first and second mating units.

20 Claims, 24 Drawing Sheets

(58) Field of Classification Search
CPC .. H02G 3/26; H02G 7/02; H02G 7/18; H02G 3/0431; H02G 3/08; H02G 3/10; H02G 15/076; H02G 3/00; H02G 3/06; H02G 3/0616; H02G 3/0683; H02G 3/18; F16L 3/02; F16L 3/06; H01B 11/06; H05K 9/0018; E04H 12/24; H01R 4/643; H01H 9/02; H02B 1/40
USPC .................................. 248/62; 174/40 CC, 66
See application file for complete search history.

(56) References Cited

U.S. PATENT DOCUMENTS

| | | | | |
|---|---|---|---|---|
| 3,531,071 | A * | 9/1970 | Kubli | F16L 3/2235 248/68.1 |
| 5,098,047 | A * | 3/1992 | Plumley | F16L 3/2235 248/68.1 |
| 5,271,586 | A * | 12/1993 | Schmidt | F16L 3/24 248/58 |
| 6,135,398 | A * | 10/2000 | Quesnel | H02G 7/053 248/74.1 |
| 6,892,990 | B2 | 5/2005 | Pisczak | |
| 2009/0218451 | A1* | 9/2009 | Lundborg | F16L 5/02 248/56 |

* cited by examiner

CABLE CLAMP

CROSS-REFERENCE TO RELATED APPLICATIONS

This application is the U.S. national phase of PCT/AU2013/000385 filed Apr. 16, 2013. PCT/AU2013/000385 claims priority to Australian patent application 2012202365 filed Apr. 16, 2012 and Australian patent application 2012216533 filed Aug. 24, 2012. The disclosures of Australian patent application 2012202365, Australian patent application 2012216533, and PCT/AU2013/000385 are hereby incorporated herein by reference.

FIELD OF THE INVENTION

The present invention relates field of cable clamps and, in particular, discloses an improved form of cable clamp arrangement suitable for clamping electrical and high-voltage cables or the like.

The invention has been developed primarily for use as cable clamp for clamping electrical cables, or more particularly for clamping high-voltage electrical cables of the type typically found in electrical sub-stations supporting 11 or 22 kW of electrical power carrying capability and will be described hereinafter with reference to this application. However, it will be appreciated that the invention is not limited to this particular field of use.

BACKGROUND OF THE INVENTION

Any discussion of the background art throughout the specification should in no way be considered as an admission that such background art is prior art, nor that such background art is widely known or forms part of the common general knowledge in the field.

Clamps for clamping power cables are well-known and come in many different varieties. One very popular form of clamp is a clamp manufactured by a company ID Technik of Germany. The clamps the aforementioned company are designed to clamp high-voltage cables or the like and come in various sizes so as to manage different size clapping requirements. An example of such an electrical cable clamp 10 is depicted in FIG. 1A. A further example of a prior art cable clamp 20 is depicted in FIG. 1B depicted attached to a busbar 50. Prior art cable clamps 10 and 20 each utilise a spring arrangement for securing the cable clamp against the bus bar as shown in FIG. 1A to prevent movement of the clamp in use. FIG. 1A illustrates a photographic view of a series of three such clamps all interconnected on a single busbar for mounting.

The aforementioned clamps have a number of disadvantages when being utilised in practice. They are manufactured with some free floating pads which are often lost and provide a complicated installation process. Further, the design of any backplane mounting strut for the clamps is ill considered in that is often difficult to install the clamp in a confined space. Often these clamps must be installed in a small spaces which results in difficult working requirements.

Accordingly, there is a need for an improved cable clamping arrangement suitable for efficient and uncomplicated use in practice.

SUMMARY

It is an object of the present invention to substantially overcome or at least ameliorate one or more of the disadvantages of the prior art, or at least to provide a useful alternative to existing cable clamps.

The following definitions are provided as general definitions and should in no way limit the scope of the present invention to those terms alone, but are put forth for a better understanding of the following description.

Unless defined otherwise, all technical and scientific terms used herein have the same meaning as commonly understood by those of ordinary skill in the art to which the invention belongs. For the purposes of the present invention, the following terms are defined below.

The articles "a" and "an" are used herein to refer to one or to more than one (i.e. to at least one) of the grammatical object of the article. By way of example, "an element" refers to one element or more than one element.

The term "about" is used herein to refer to quantities that vary by as much as 30%, preferably by as much as 20%, and more preferably by as much as 10% to a reference quantity.

Throughout this specification, unless the context requires otherwise, the words "comprise", "comprises" and "comprising" will be understood to imply the inclusion of a stated step or element or group of steps or elements but not the exclusion of any other step or element or group of steps or elements.

In accordance with a first aspect of the present invention, there is provided a cable clamping unit for clamping a cable including: a first and second mating units for clamping around the cable, each of the mating units further including a soft sleeve for engaging the cable, the sleeves being at least semi permanently attached to a corresponding mating unit.

The soft sleeves are preferably attached by means of a series of posts mating with a corresponding series of cavities and forming a snug fit there to. The series of posts are preferably formed on the sleeve and the series of cavities are preferably formed in the mating units. The soft sleeve further preferably engages a corresponding mating unit in a snug fit by means of an arcuate lip engaging a slot. A lip can be formed on the soft sleeve and the slot can be formed on the mating unit.

The clamping units are preferably stackable. The clamping units can include a series of through hole screw, with the through hole screws of adjacent clamping units being interconnected. The non cable engaging surface of the mating unit forms a generally planar supporting surface for stacking.

Multiple clamping units can be attached to a U shaped busbar with mating bolts. The mating bolts can include a profiled head which engages with the busbar to resist rotation of the mating bolt.

According to a second aspect there is provided a cable clamp adapted for clamping electrical cables. The cable clamp may comprise a busbar securing portion for securing the cable clamp to a busbar. The cable clamp may further comprise a first mating unit comprising a first cable locating formation. The cable clamp may further comprise at least two securing nuts comprising a threaded portion for engaging at least two attachment bolts and also engaging at least two respective securing bolts. In particular arrangements, the clamp may comprise two, three or four securing nuts and two, three or four securing bolts respectively. The cable clamp may further comprise a second mating unit comprising a second cable locating formation. The second mating unit may be adapted to engage with said first mating unit thereby to securely clamp an electrical cable located between respective first and second locating formations of the first and second mating units. The cable clamp may be particularly adapted for clamping high-voltage electrical cables.

The busbar securing portion may comprise a busbar engaging portion comprising at least two apertures adapted to receive at least two respective attachment bolts. The busbar securing portion may comprise two, three or four apertures and two, three or four attachment bolts respectively.

The first mating unit may comprise an arcuate upper surface forming the first cable locating formation. The first mating unit may further comprise an arcuate resilient sleeve semi-permanently attached to the upper arcuate surface for engaging an electrical cable therewith. The first mating unit may further comprise at least two cavities therein adapted to receive said at least two attachment bolts for attachment of said first mating unit to the busbar. The first mating unit may comprise two, three or four cavities therein to receive two, three or four attachment bolts respectively.

The second mating unit may comprise an arcuate lower surface forming the second cable locating formation. The second mating unit may further comprise an arcuate resilient sleeve semi-permanently attached to said second cable locating formation for engaging an electrical cable therewith. The second mating unit may further comprise at least two cavities aligned with said at least two cavities of said first mating unit and adapted to receive at least two securing bolts to secure said second mating unit to said first mating unit such that said upper arcuate surface and said lower arcuate surface of respective mating units are aligned and therefore secure an electrical cable therein. The second mating unit may comprise two, three or four cavities therein to receive two, three or four securing bolts respectively.

The cable clamp may further comprise at least two securing nuts. The cable clamp may comprise two, three or four securing nuts as required. The at least two securing nuts may comprise a threaded portion for engaging a respective one of the at least two attachment bolts and also a respective one of the at least two respective securing bolts.

The at least two cavities of the first mating unit and the at least two cavities of the second mating unit may each be further adapted to at least partially conceal a respective one of the at least two securing nuts. Concealment, even partially, of the metal securing nuts may significantly minimise the chance of unwanted corona discharge, particularly associated with electrical cabling, particularly associated with high-voltage electrical cables in the presence of metal surfaces having sharp edges such as corners of hexagonal or octagonal securing nuts or the like.

The arcuate resilient sleeves may be attached to a respective one of the first and second mating units by means of a series of posts on the sleeves. The posts may be adapted to mate with a corresponding series of cavities in the respective mating unit and forming a snug fit to respective cable locating formations of the first and second mating units.

The first mating unit and the second mating unit may each be formed from a non-conducting material. The first mating unit and the second mating unit may be formed from a material having a high dielectric constant to assist in minimisation of unwanted corona discharge. The first mating unit and the second mating unit may be formed from a plastics material. The first mating unit and the second mating unit may be formed via an injection moulding technique.

The first mating unit and the second mating unit may be substantially identical. The first and second mating units may be formed from the same mould in the injection moulding technique. This provides a significant manufacturing advantage as it practically halves the tooling costs that would be needed to create two separate moulds and production lines to manufacture two different injection moulded mating units. Therefore only a single mould is required to produce both mating units and two such mating units are packaged together to form a single cable clamp on installation. This system of identical mating units also has significant advantages in the installation of the cable clamps, which is often done in confined or difficult spaces, since there is no need for the installer to identify which of the mating units is the top and which is the bottom—either mating unit in the cable clamp kit would suffice as either the top or bottom mating unit which therefore minimises the chance of install error and re-work, thus making the installation an easier and quicker process than using prior art clamps.

In an arrangement of the second aspect, there is provided a cable clamp adapted for clamping electrical cables, comprising: a busbar securing portion for securing the cable clamp to a busbar; a first mating unit comprising a first cable locating formation; at least two securing nuts comprising a threaded portion for engaging at least two respective attachment bolts and also for engaging at least two respective securing bolts; and a second mating unit comprising a second cable locating formation and adapted to engage with said first mating unit thereby to securely clamp an electrical cable located between respective first and second locating formations of the first and second mating units. In a particular arrangement, the cable clamp may be adapted for clamping high-voltage electrical cables.

In a particular arrangement of the second aspect, there is provided a cable clamp adapted for clamping electrical cables, comprising a) a busbar securing portion comprising a busbar engaging portion comprising at least two apertures adapted to receive at least two respective securing bolts; b) a first mating unit comprising: an arcuate upper surface; an arcuate resilient sleeve semi-permanently attached to said upper arcuate surface for engaging an electrical cable therewith, and at least two cavities therein adapted to receive said at least two attachment bolts for attachment of said first mating unit to a busbar; c) at least two securing nuts comprising a threaded portion for engaging said attachment bolts and also engaging at least two respective securing bolts, said at least two cavities of said first mating unit further adapted to at least partially conceal a respective one of said at least two securing nuts; and d) a second mating unit adapted to engage with said first mating unit, said second mating unit comprising: an arcuate lower surface; an arcuate resilient sleeve semi-permanently attached to said arcuate lower surface for engaging an electrical cable therewith; at least two cavities aligned with said at least two cavities of said first mating unit and adapted to: at least partially conceal a respective one of said at least two securing nuts; and to receive at least two securing bolts adapted to engage with the threaded portion of a respective securing nut thereby to secure said second mating unit to said first mating unit such that said upper arcuate surface and said lower arcuate surface of respective mating units are aligned and therefore secure an electrical cable therein. Concealment, even partially, of the metal securing nuts may significantly minimise the chance of unwanted corona discharge associated with electrical cabling, and particularly associated with high-voltage electrical cabling in the presence of metal surfaces having sharp edges such as corners of hexagonal or octagonal securing nuts or the like.

According to a third aspect there is provided a kit for a cable clamp for clamping electrical cables. The kit may comprise a busbar securing portion for securing the cable clamp to a busbar. The kit may further comprise a first mating unit. The first mating unit may comprise a first cable locating formation. The kit may further comprise at least two attachment bolts for attachment of the busbar securing portion and the first mating unit to the busbar. The kit may further comprise at least two securing nuts comprising a threaded portion for engaging a respective one of the at least two attachment bolts thereby to secure the first mating unit and the busbar securing portion to the busbar. The kit may further comprise a second mating unit. The second mating unit may comprise a second cable locating formation. The kit may further comprise at least two securing bolts adapted to engage with the threaded portion of a respective one of the securing nuts thereby secure the second mating unit in cooperation to the first mating unit and thereby secure a cable located in engagement with the first and the second cable locating formations.

In an arrangement of the third aspect, there is provided a kit for a cable clamp for clamping electrical cables, the kit comprising:
- a busbar securing portion for securing the cable clamp to a busbar;
- a first mating unit comprising a first cable locating formation;
- at least two attachment bolts for attachment of the busbar securing portion and the first mating unit to the busbar
- at least two securing nuts comprising a threaded portion for engaging a respective one of said at least two attachment bolts thereby to secure the first mating unit and the busbar securing portion to the busbar;
- a second mating unit comprising a second cable locating formation;
- at least two securing bolts adapted to engage with said threaded portion of a respective one of said securing nuts thereby secure the second mating unit in cooperation to said first mating unit and thereby secure a cable located in engagement with said first and said second cable locating formations.

The kit may further comprise: a first arcuate resilient sleeve semi-permanently attached to the first cable securing formation of the first mating unit for engaging an electrical cable therewith; and a second arcuate resilient sleeve semi-permanently attached to the second cable securing formation of the second mating unit for engaging an electrical cable therewith.

In a particular arrangement of the third aspect, the first and the second mating units may be substantially identical.

In a particular arrangement of the third aspect, the cable clamp may be adapted for clamping high-voltage electrical cables.

The arcuate resilient sleeves may be attached to a respective one of the first and second mating units by means of a series of posts on the sleeves. The posts may be adapted to mate with a corresponding series of cavities in the respective mating unit and forming a snug fit to respective cable locating formations of the first and second mating units. The arcuate resilient sleeves may be substantially identical.

The first mating unit and the second mating unit may be formed from a non-conducting material. The first mating unit and the second mating unit may be formed from a plastics material. The first mating unit and the second mating unit may be formed via an injection moulding technique. The first mating unit and the second mating unit may be substantially identical.

The kit may further comprise washers adapted to engage the at least two attachment bolts and the at least two securing bolts to assist in securing the first and second mating units as would be appreciated by the skilled addressee.

BRIEF DESCRIPTION OF THE DRAWINGS

Arrangements of the above aspects will now be described, by way of an example only, with reference to the accompanying drawings wherein:

FIG. 20 depicts the busbar securing portion engaged with a busbar, FIG. 21 depicts a first mating unit of the cable clamp engaged with a busbar and FIG. 22 depicts the cable clamp engaged with the busbar and clamping a cable.

DESCRIPTION OF PREFERRED AND OTHER EMBODIMENTS

Figure 1A:
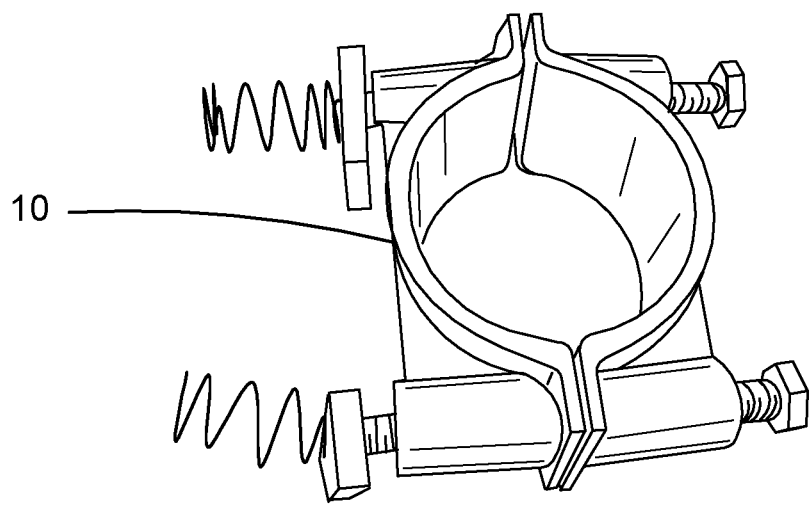
FIG. 1A is a picture of a prior art cable clamp for electrical cables.
Figure 1B:
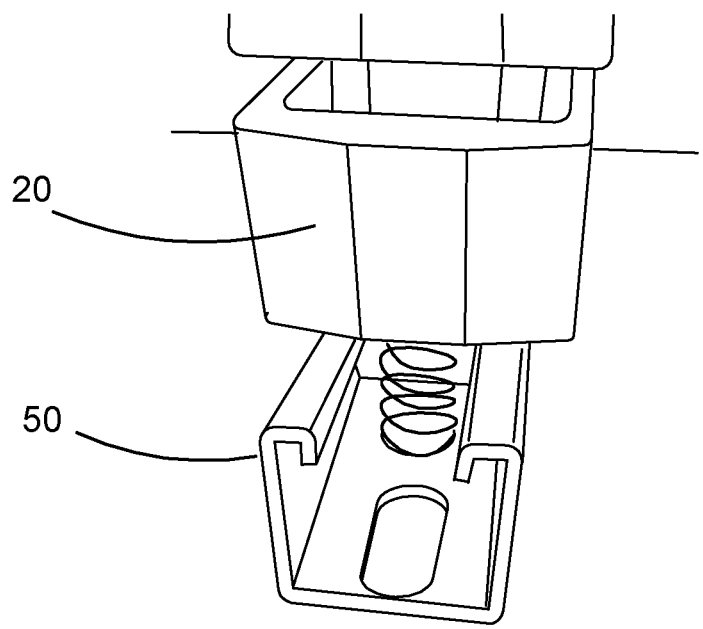
FIG. 1B is a picture of a prior art cable clamp indicating a method for securing the cable clamp to a bus bar.
Figure 1C:
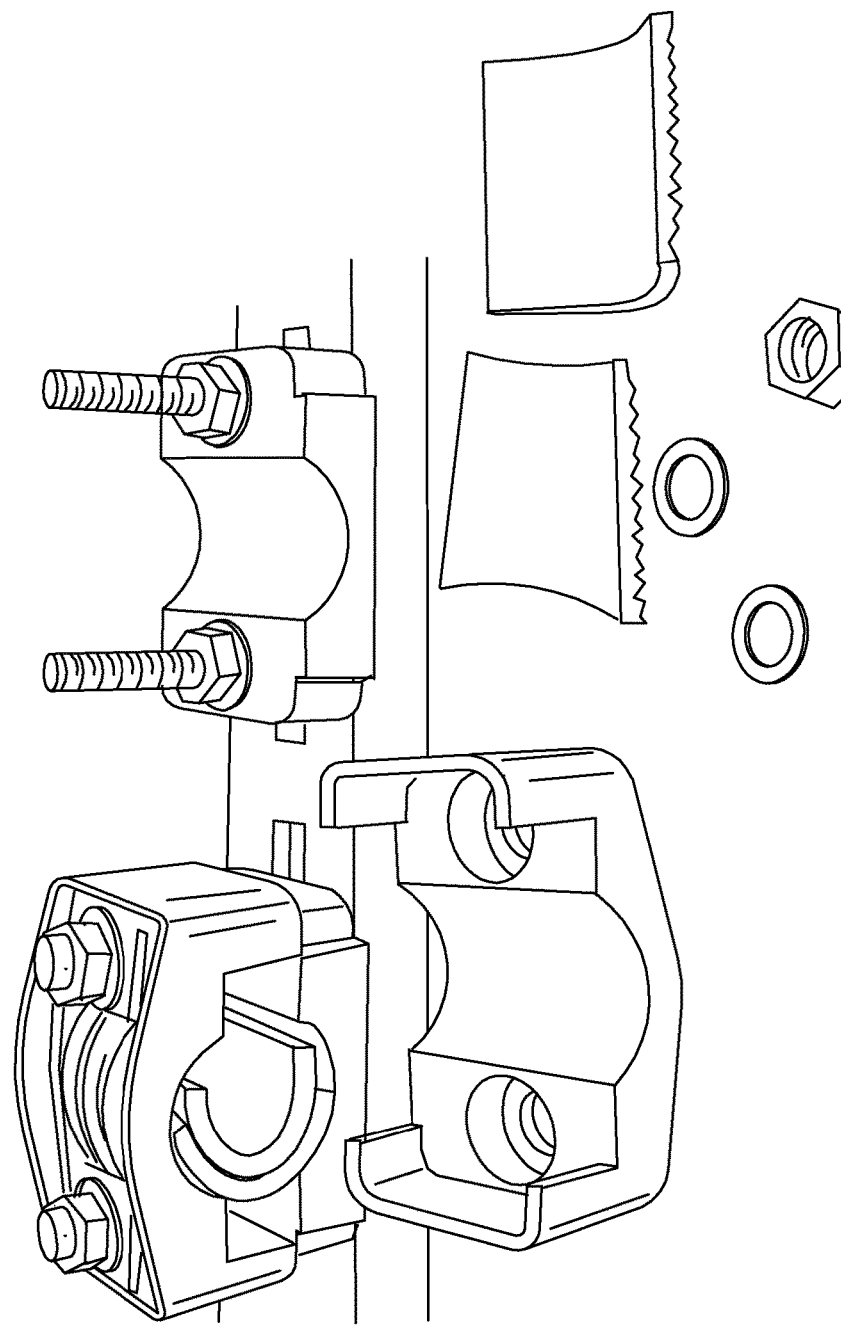
FIG. 1C illustrates a prior art clamping device, partially disassembled.
Figure 2:
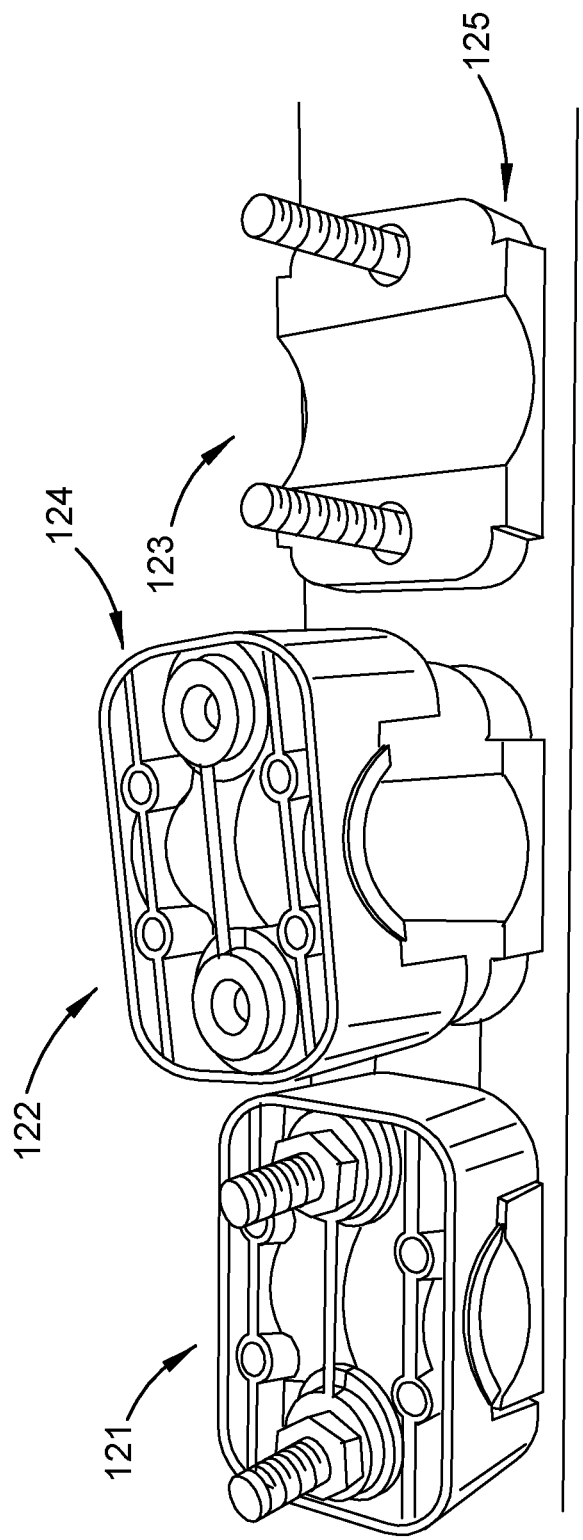
FIG. 2 illustrates a photograph of the clamping device of the preferred embodiment, again, partially disassembled.

Referring to the drawings, there is provided an enhanced clamping arrangement. A particular arrangement of a cable clamp as disclosed herein is initially the illustrated in FIG. 2 which illustrates three clamping units 121-123 in various states of assembly. The first unit 121 is fully assembled, with the unit 122 being almost separated in half and the unit 123 having the bottom half only assembled.

The clamping units are made from two mating units e.g. 123, 125 which are affixed together. Each mating unit includes a rubber like mating pad which is affixed to the mating unit in a semi permanent manner such that they do not fall off in general use. This can be achieved using a number of techniques.

Figure 3:
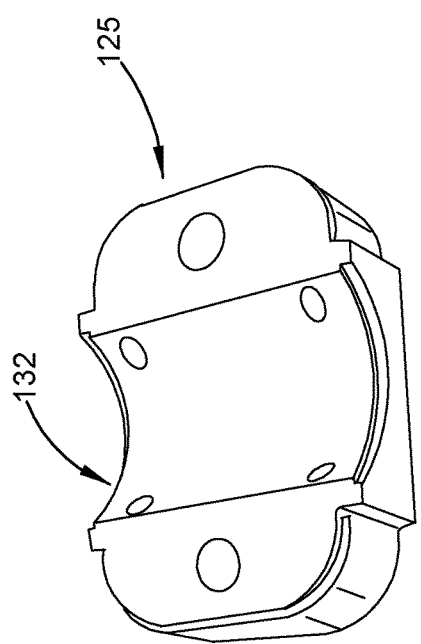
FIG. 3 and FIG. 4 illustrate photographs of lower and upper matting units of a clamping unit.
Figure 3:
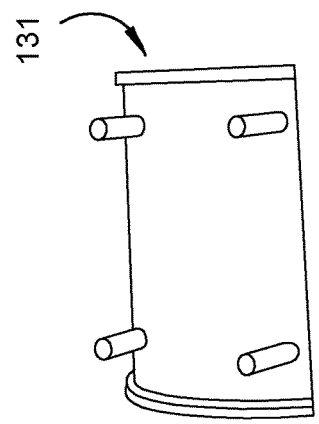

FIG. 3 shows the bottom mating unit 125 which includes a series of holes e.g. 132 for the engagement of corresponding posts formed on a mating pad 131, which, in this instance, includes four mating posts. The mating pad 131 also includes an edge lip which mates with the edge lip of mating unit 125. The mating pad can be formed from a soft pad like material which forms a bed for the clamped cable to stop movement thereof.

Figure 4:
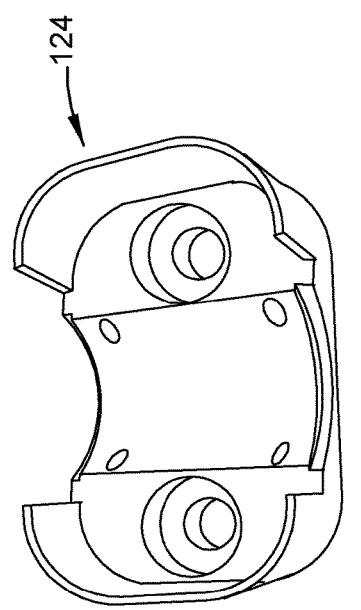
Figure 4:
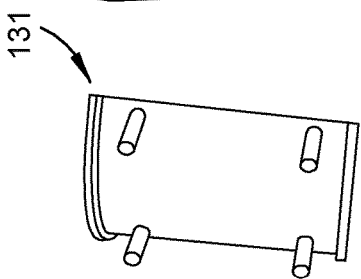

Similarly FIG. 4 illustrates the top mating unit, also with a series holes for receiving corresponding posts of mating pad 131, in addition to having a mating lip for the mating lip at the ends of the mating pads.

Figure 5:
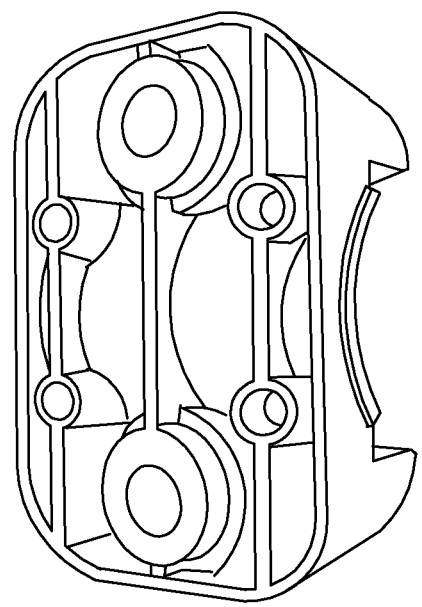
FIG. 5 and FIG. 6 illustrate the back surface photographs of matting units of a clamping unit.
Figure 6:
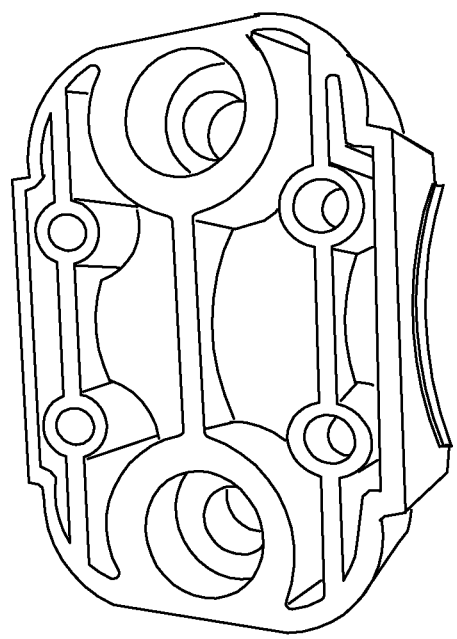
Figure 7:
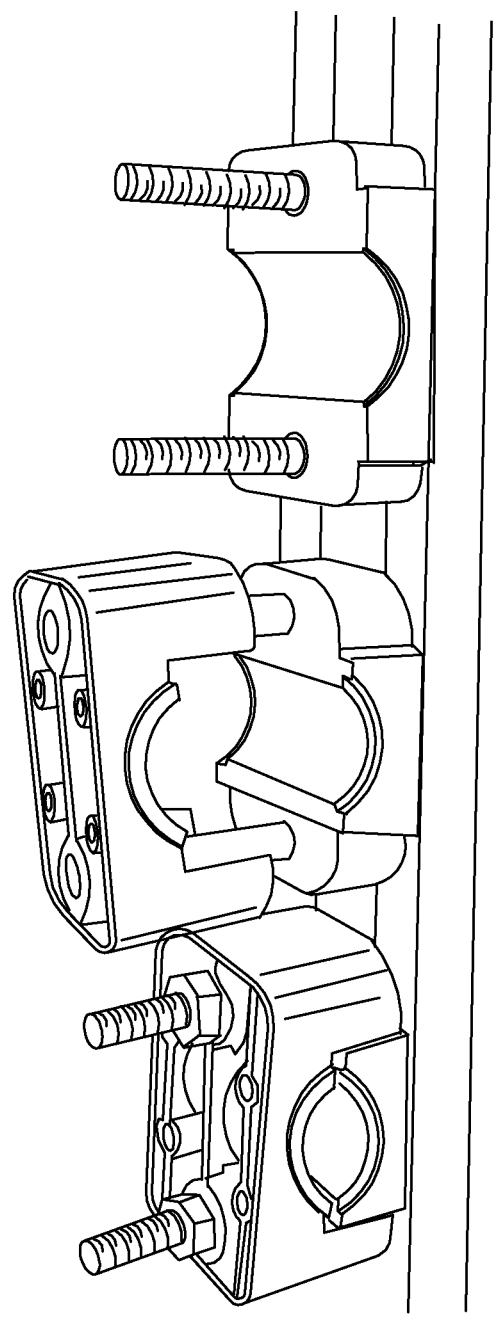
FIG. 7 illustrates a photograph of the clamping device of the preferred embodiment, again, partially disassembled.
Figure 8:
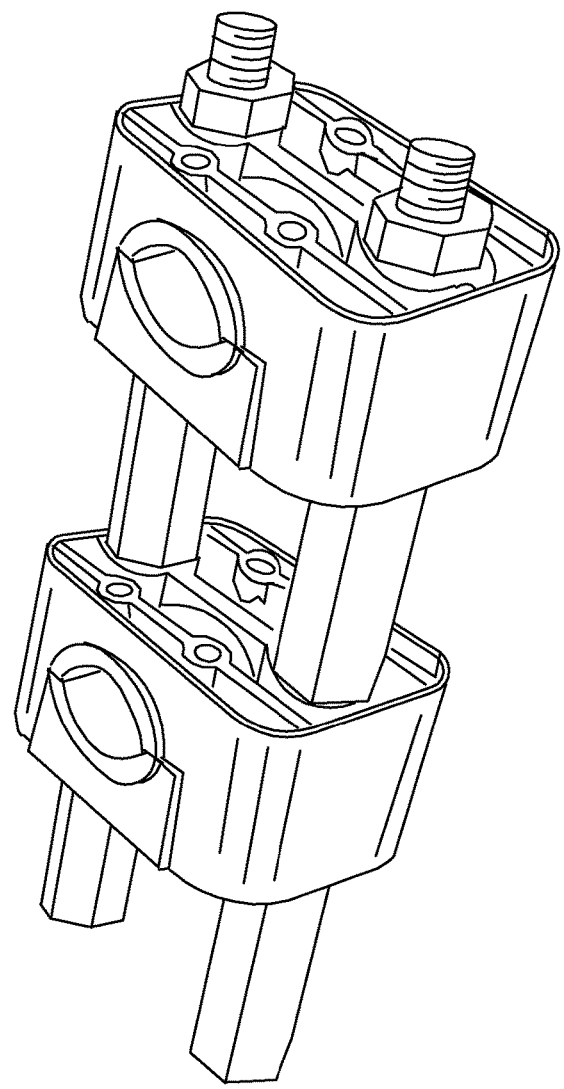
FIG. 8 and FIG. 9 illustrate a first form of stacking of clamping units.
Figure 9:
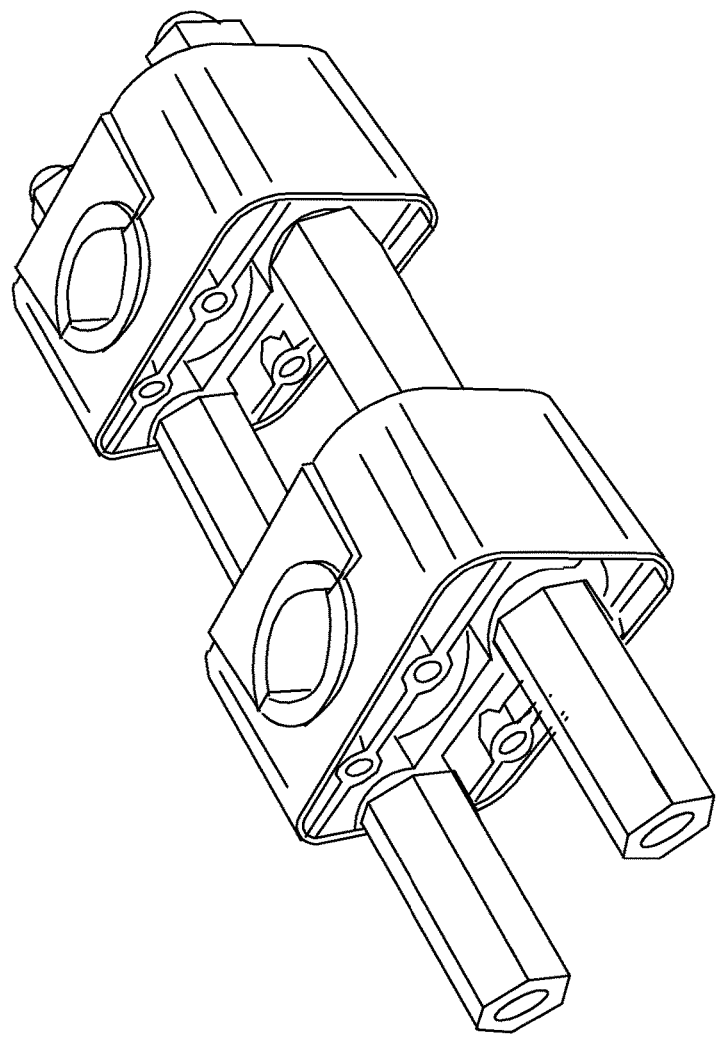

A further advantage of the design of the cable clamp arrangements disclosed herein is that the clamping units are stackable allowing for compact stacking of multiple units. FIG. 5 and FIG. 6 illustrate the planar back surfaces of each of the mating units. This leads to possible stacking of multiple units. A simple form of stacking of units is shown in FIG. 8 and FIG. 9 wherein steel posts are used to clamp multiple clamping units in a spaced apart manner.

Figure 10:
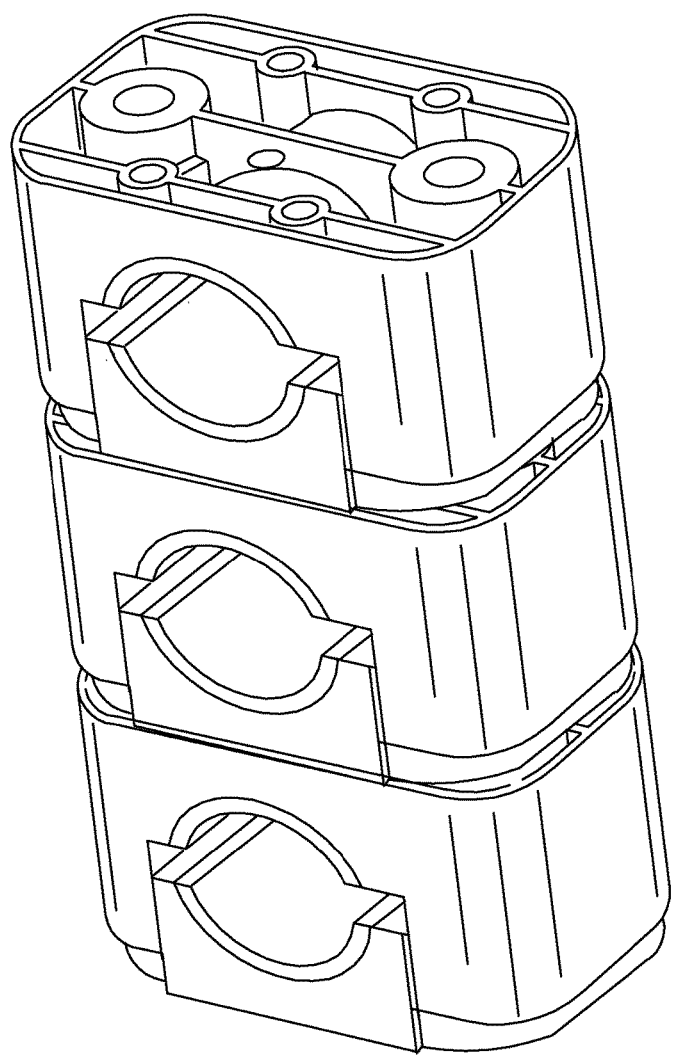
FIG. 10 is a computer rendering of another form of stacking of clamping units.

FIG. 10 illustrates an alternative arrangement where multiple clamping units are stacked together.

Figure 11:
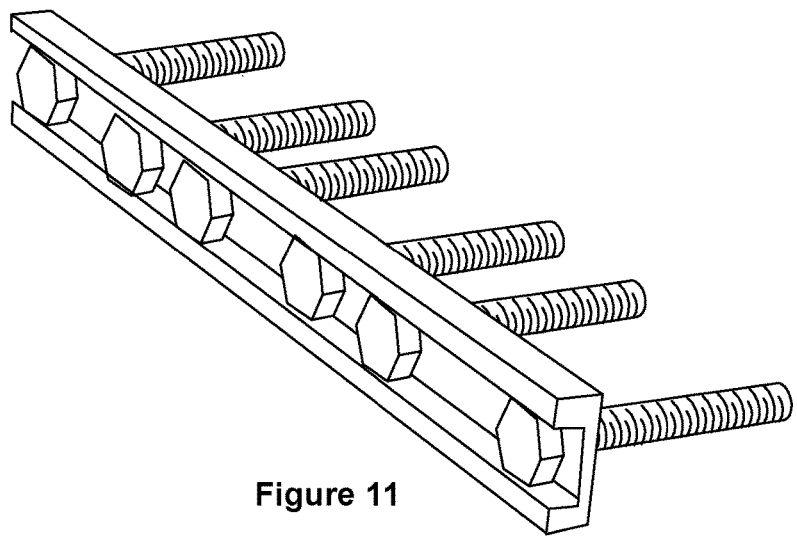
FIG. 11 is a photograph of a non pad mount busbar assembly.
Figure 12:
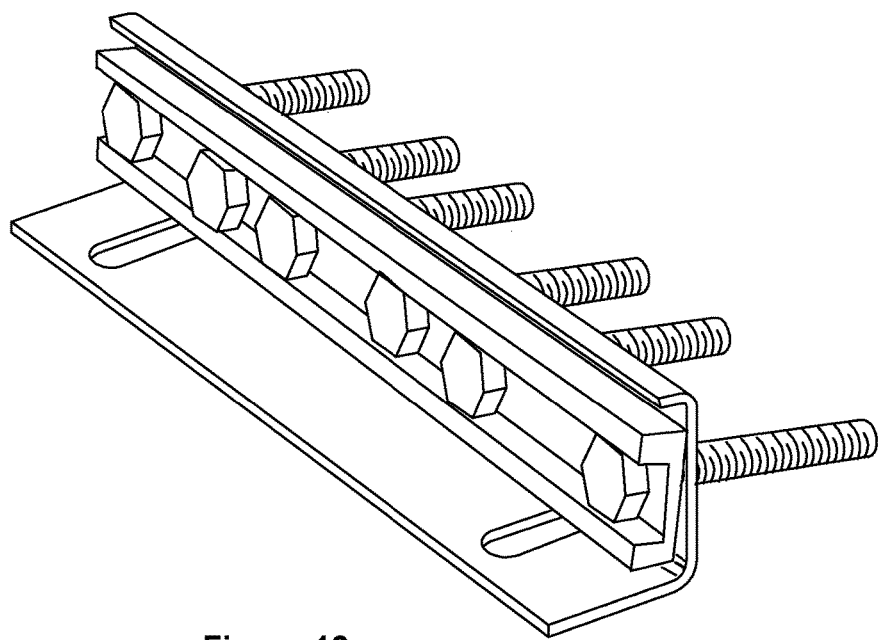
FIG. 12 is a photograph of a pad mounted busbar assembly.
Figure 13:
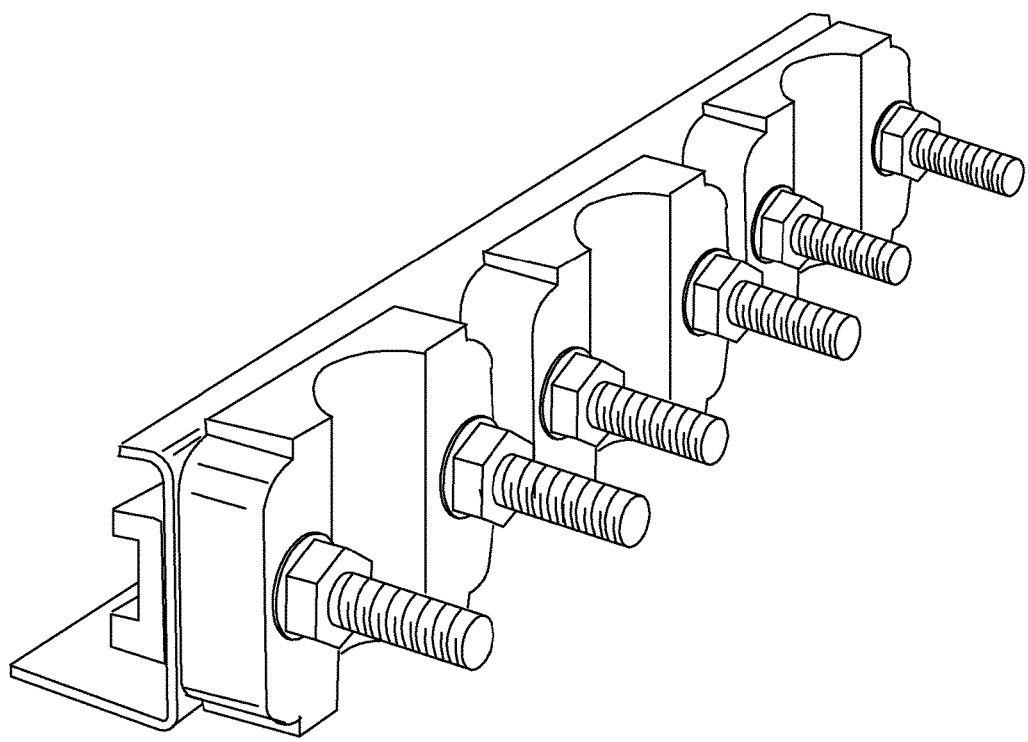
FIG. 13 is a photograph of the bottom mating units attached to a pad mounted busbar.
Figure 14:
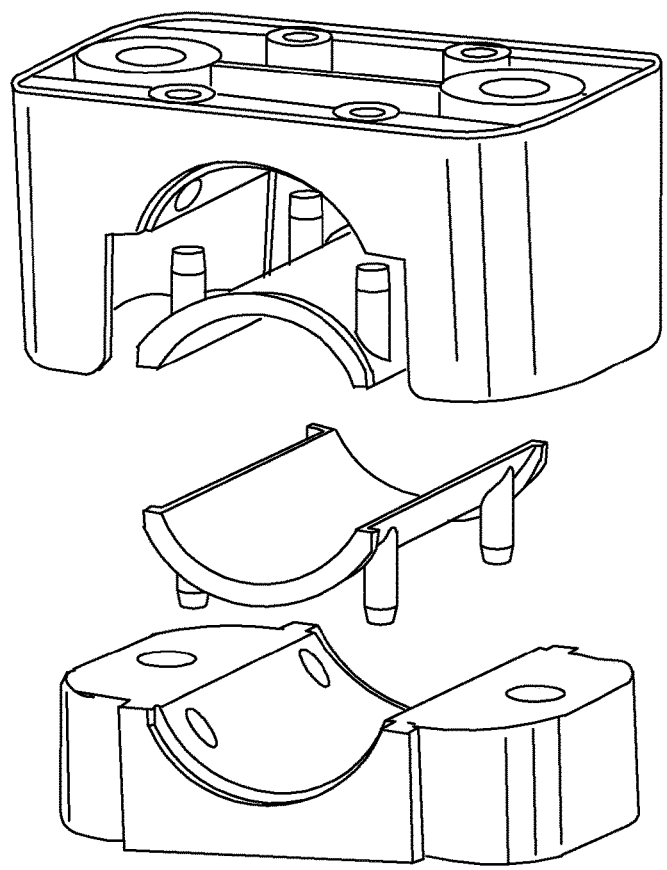
FIG. 14 is a computer generated exploded perspective of the insulating portions of the cable clamp of the preferred embodiment.

The design of the particular arrangements disclosed herein provides a number of significant advantages. As illustrated in FIG. 11 and FIG. 12, the clamping units are designed to be mounted on a bus bar having a U shaped cross section with a hexagonal headed bold being held in the cusp of the U shape. This provides for simple mounting with the hexagonal bolt being firmly supported both in a pad mounted arrangement (FIG. 12) and non-pad mounted arrangements (FIG. 11). The mating portions of each clamping unit can then be bolted to the busbar (FIG. 13). This allows for one bus bar to work both inside and outside a pad mount.

Further, whilst the rubber mating pad is separable from the mating unit, it is designed to not be easily separated during normal use with the posts being inserted into corresponding holes in the mating units for semi-permanent attachment thereto.

Further the utilisation of the busbar arrangement allows for multiple units of a phase to be assembled together.

Figure 15A:
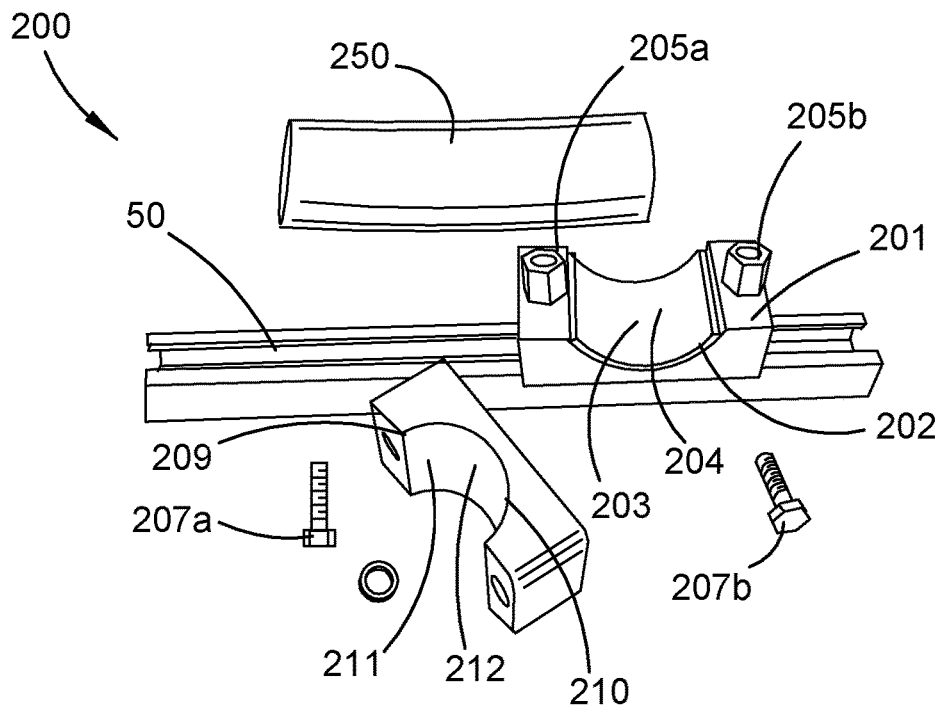
FIG. 15A is a picture of an arrangement of a cable clamp as disclosed herein
Figure 15B:
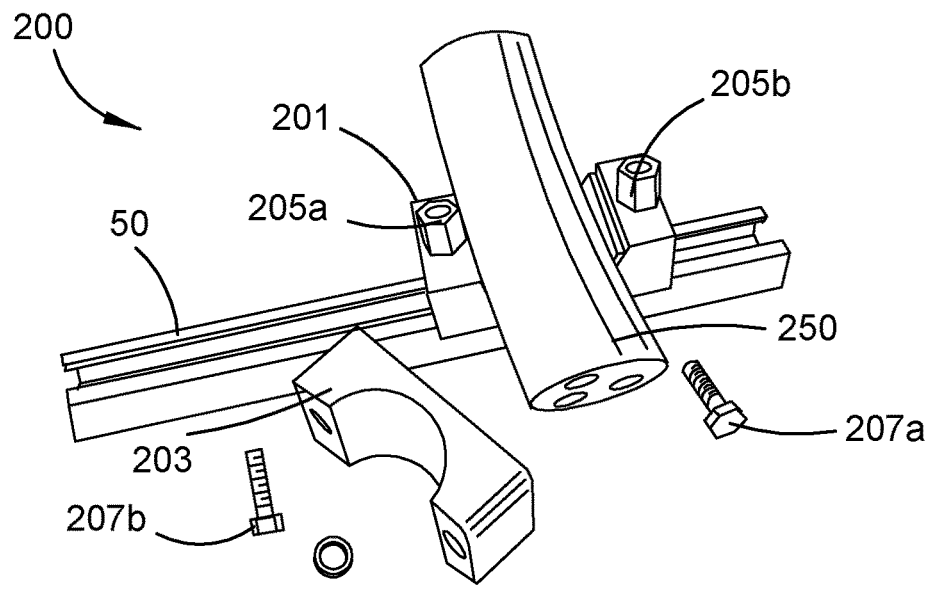
FIG. 15B is a picture of an arrangement of a cable clamp as disclosed herein depicted with a electrical cable engaging a cable locating portion of the cable clamp.
Figure 16A:
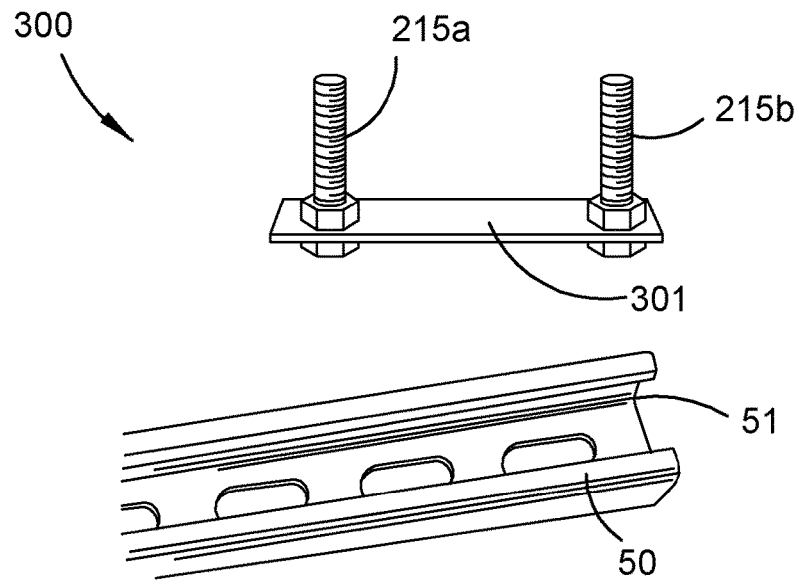
FIG. 16A is a picture of a busbar securing portion of a cable clamp as disclosed herein and a busbar.
Figure 16B:
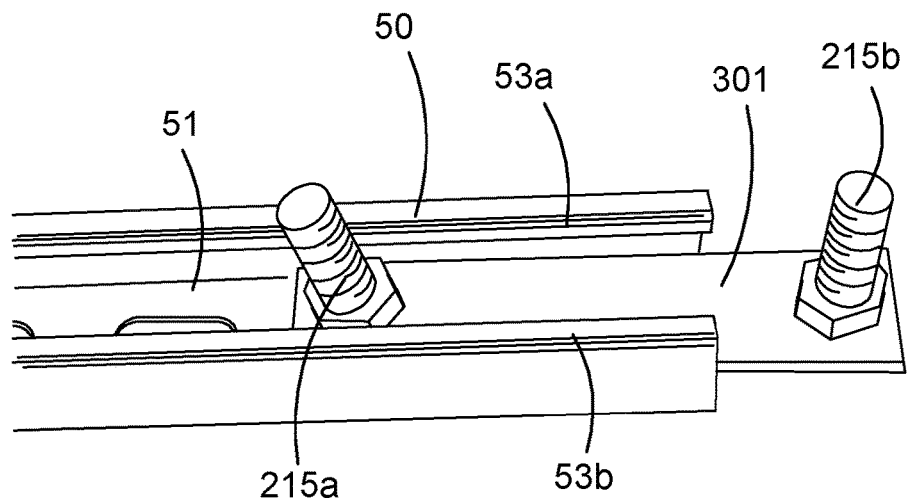
FIG. 16B is a further picture of a busbar securing portion of a cable clamp as disclosed herein shown engaging a busbar.

Referring to FIGS. 15A and 15B, there is provided a further arrangement of a cable clamp 200 adapted for clamping electrical cables 250 and the like. The cable clamp 200 comprises a busbar securing portion (portion 300 as shown in FIGS. 16A and 16B) for securing the cable clamp 200 to a busbar 50. The cable clamp further comprises a first mating unit 201 comprising a first cable locating formation 203. The cable clamp 200 further comprises at least two securing nuts 205a and 205b (for example barrel nuts) each comprising a threaded portion for engaging attachment bolts (bolts 215a and 215b shown in FIGS. 16A and 16B) of the busbar securing portion 300 and also engaging at least two respective securing bolts 207a and 207b when in use. The cable clamp 200 further comprises a second mating unit 209 comprising a second cable locating formation 211 as shown in either FIG. 16A or FIG. 17A. The second mating unit 209 is adapted to engage with the first mating unit 201 thereby to securely clamp an electrical cable 250 located between respective first and second locating formations (203 and 211 respectively) of the first and second mating units (201 and 209 respectively). The electrical cable may be a high-voltage electrical cable.

The first mating unit 201 comprises an arcuate surface 202 forming the first cable locating formation 203. In use, the arcuate surface 202 forming cable locating formation 203 is the upper surface of the first mating unit 201 when attached to a busbar 50. The first mating unit 201 further comprises an arcuate resilient sleeve 204 semi-permanently attached to said upper arcuate surface 202 for engaging an electrical cable 250 therewith. The first mating unit 201 further comprises at least two cavities therein (cavities 220a and 220b as shown in FIG. 17A) adapted to receive said at least two attachment bolts (not shown) for attachment of said first mating unit 201 to the busbar 50.

The first mating unit 201 and the second mating unit 209 are typically be formed from a non-conducting material, e.g. plastic or other non-conducting material as would be appreciated by the skilled addressee. In particular arrangements, the first mating unit 201 and the second mating unit 209 are identical. Having the first and second mating units being formed from identical moulds provides a significant advantage in both the manufacturing of the cable clamp 200 and also for ease of installation.

Figure 17A:
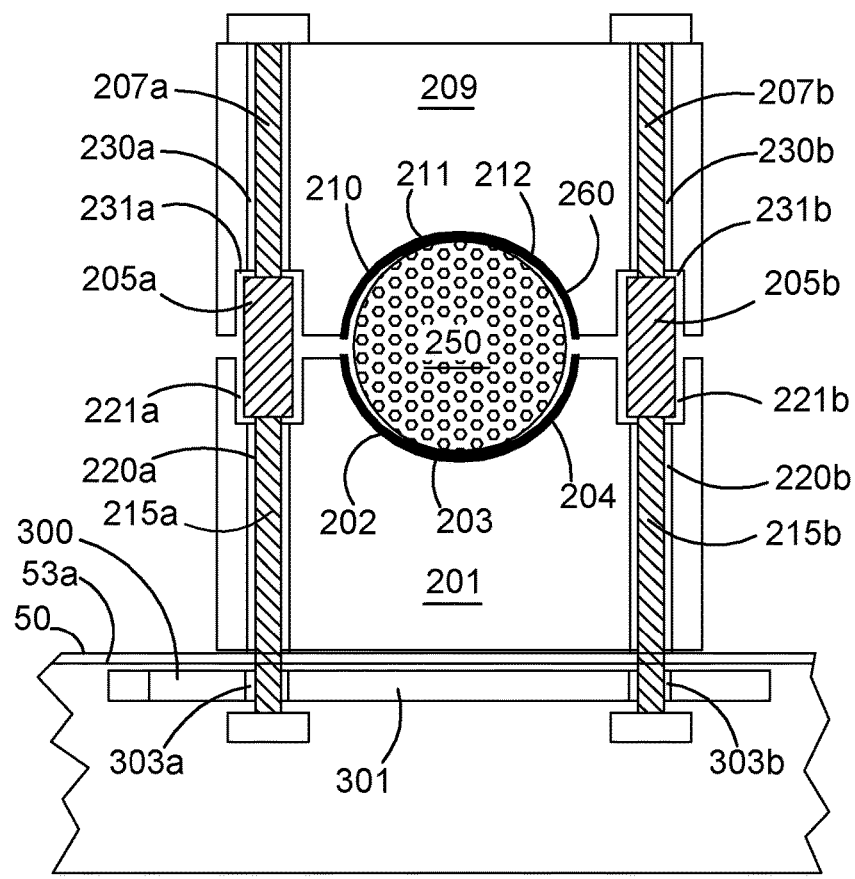
FIGS. 17A and 17B are cutaway schematic views of a cable clamp for electrical cables as disclosed herein depicted clamped to a busbar and clamping an electrical cable.

Referring to either FIG. 16A or FIG. 17A, the busbar securing portion 300 comprises a busbar engaging portion 301 comprising at least two apertures 303a and 303b adapted to receive at least two respective attachment bolts 215a and 215b. In use, the busbar engaging portion slides into the central cavity 51 of busbar 50 with attachment bolts 215a and 215b extending out of the busbar central cavity 51 as is shown in FIG. 16B. The first mating unit 201 is then fitted to the busbar engaging unit 50 such that the attachment bolts 215a and 215b are inserted into a respective one of the at least two cavities 220a and 220b as shown in FIG. 4. Securing nuts 205a and 205b are screwed onto respective attachment bolts 215a and 215b to secure the first mating unit 201 to the busbar 50. Screwing the securing nuts 205a and 205b onto the respective attachment bolts causes the attachment bolts 215a and 215b to lift the busbar engaging portion 301 until it engages with the upper lips 53a and 53b of the busbar 50 thereby securing the first mating unit 201 to the busbar 50.

Figure 15C:
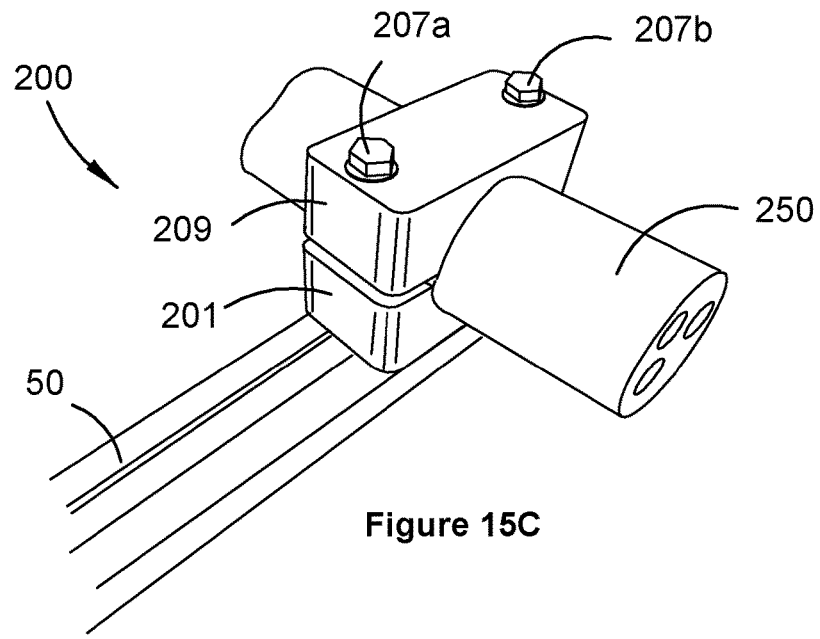
FIG. 15C is picture of an arrangement of a cable clamp attached to a busbar and securely engaging an electrical cable.
Figure 15D:
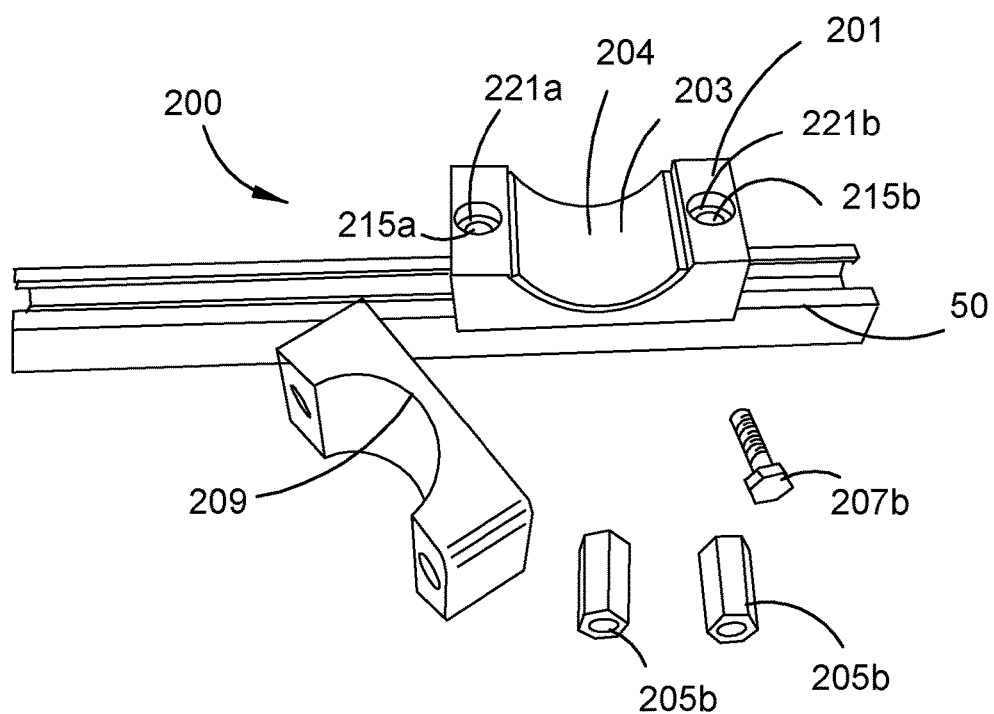
FIG. 15D is a picture of a first mating unit of an arrangement of a cable clamp as disclosed herein depicting the attachment of the first mating unit to a bus bar.
Figure 17B:
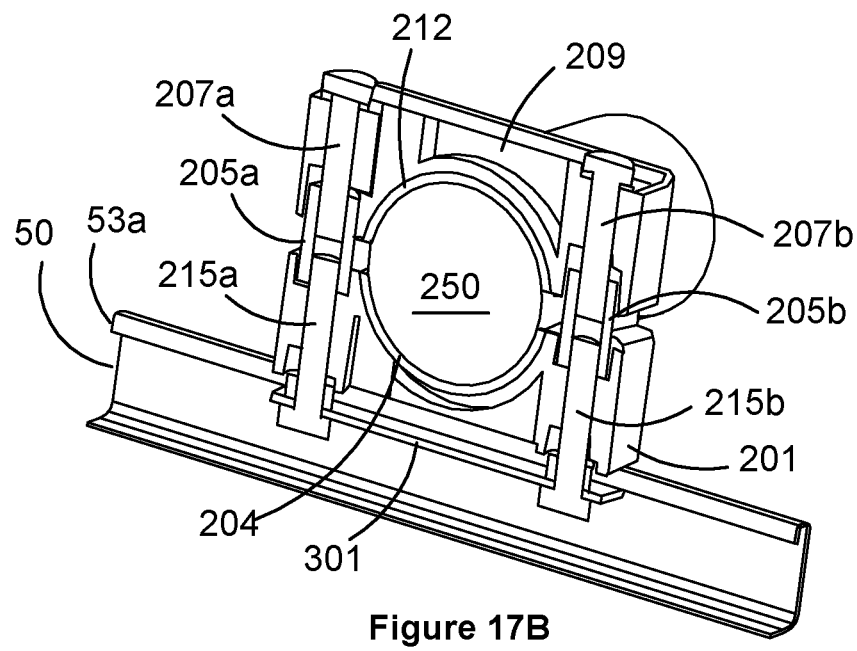

Referring back to either FIG. 15B or FIG. 17A, the second mating unit 209 comprises an arcuate surface 210 forming the second cable locating formation 211. In use, the arcuate surface 210 forming cable locating formation 211 is the lower surface of the second mating unit 209 when attached to a busbar 50 as shown in FIGS. 17A and 17B. The second mating unit 209 further comprises an arcuate resilient sleeve 212 semi-permanently attached to the second cable locating formation 211 for engaging an electrical cable 250 therewith. The second mating unit 209 further comprises at least two cavities (cavities 230a and 230b as shown in FIG. 17A)

which in use are aligned with the at least two cavities (220*a* and 220*b*) of the first mating unit 201 as can be seen in FIG. 17A. The at least two cavities (230*a* and 230*b*) of the second mating unit 209 are adapted to receive at least two securing bolts (bolts 207*a* and 207*b*) to secure the second mating unit 209 to the first mating unit 201 such that the upper arcuate surface 202 and said lower arcuate surface 210 of respective mating units 201 and 209 are aligned and therefore secure an electrical cable 250 therein as depicted in FIG. 15C and FIG. 17A. In use, securing bolts 207*a* and 207*b* are screwed into securing nuts 205*a* and 205*b* as can be seen in FIG. 17A thereby to secure the second mating unit 209 to the first mating unit 201 and to secure a cable 250 between the first and second mating units in the generally circular cavity 260 formed by the alignment of the first locating portion 203 and the second locating portion 211 when the first and second mating units 201 and 209 are secured to the busbar 50 when in use.

Figure 18:
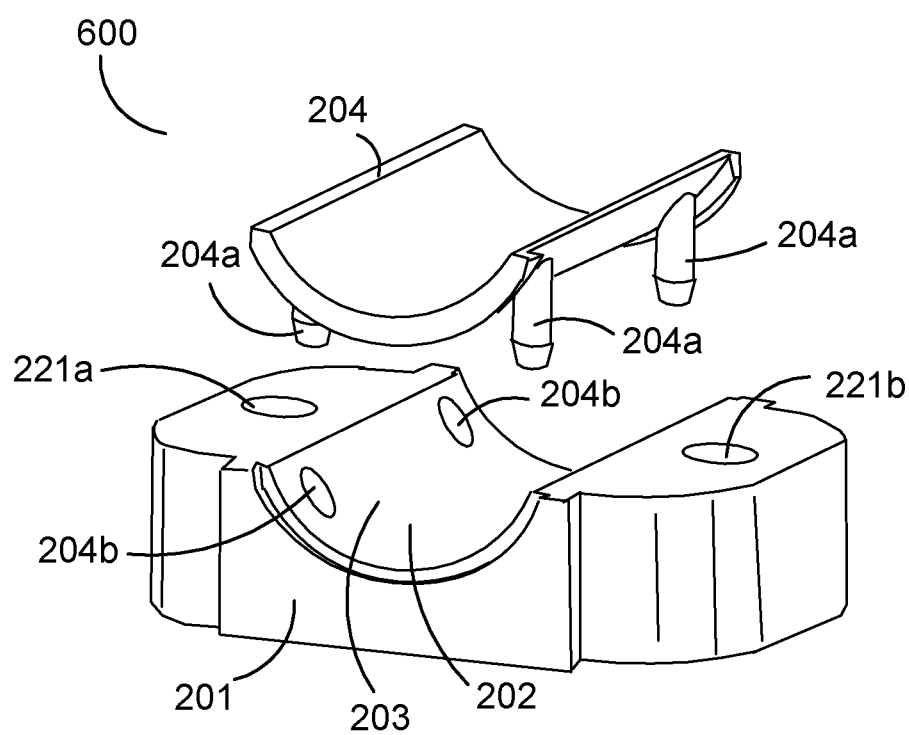
FIG. 18 is an exploded view of a particular arrangement of a first mating unit of the cable clamp as disclosed herein depicting the relationship between an arcuate surface of the mating unit and a resilient sleeve to form a cable locating formation of the mating unit.

Referring to FIGS. 17A and 17B it can be seen that cavities 220*a* and 220*b* of the first mating unit 201 comprise an enlarged cavity portion 221*a* and 221*b* respectively to receive the securing nuts 205*a* and 205*b* respectively when the securing nuts are engaged with attachment bolts 215*a* and 215*b*. Is can thus be seen that enlarged cavity portions 221*a* and 221*b* at least partially conceal the securing nuts 205*a* and 205*b* when in use. Similarly, cavities 230*a* and 230*b* of the second mating unit 209 each comprise 231*a* and 231*b* respective enlarged cavity portion 231*a* and 231*b*. Enlarged cavity portions 231*a* and 231*b* of the second mating unit are adapted to receive the securing nuts 205*a* and 205*b* when the second mating unit 209 is engaged with the first mating unit 201. Therefore in use, the at least two cavities 220*a* and 220*b* of the first mating unit 201 and the at least two cavities 230*a* and 230*b* of the second mating unit 209 act in cooperation to conceal the securing nuts 205*a* and 205*b* when in use. Concealment, even partially, of the securing nuts 205*a* and 205*b* may significantly minimise the chance of unwanted corona discharge associated with electrical cabling (for example electrical cable 250) in the presence of metal surfaces having sharp edges such as corners of hexagonal or octagonal securing nuts 205*a* and 205*b* or the like, particularly associated with the minimisation of corona discharge associated with electrical cabling, and particularly associated with high-voltage electrical cabling. This is achieved by ensuring an additional non-conductive material (comprising mating units 201 and 209) is located intermediate the electrical cable and the edges of the securing nuts where corona discharge is likely to occur, thereby forming an increased potential barrier between the electrical cable and potential corona forming surfaces The arcuate resilient sleeves 204 and 212 are semi-permanently attached to a respective one of the first and second mating units (201 and 209 respectively) by means of a series of posts 204*a* (of sleeve 204 as shown in FIG. 18) on the sleeves. The posts 204*a* are adapted to mate with a corresponding series of cavities (e.g. cavities 204*b* formed in the arcuate surface 202 of the first mating unit 201 as shown in FIG. 18) in the respective mating unit and forming a snug fit to the respective cable locating formations 203 and 211 of the first and second mating units respectively.

Figure 19A:
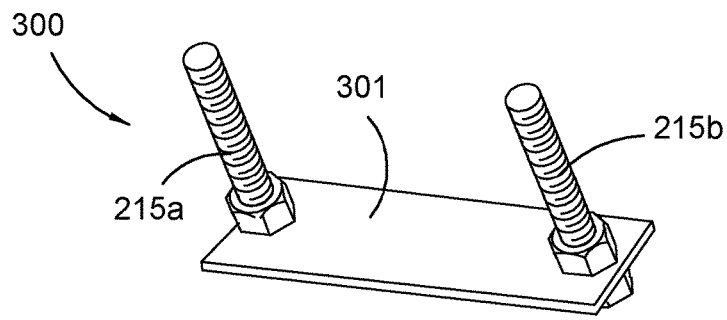
FIGS. 19A to 19E depict the assembly sequence of the cable clamp arrangement of FIG. 17A.
Figure 19B:
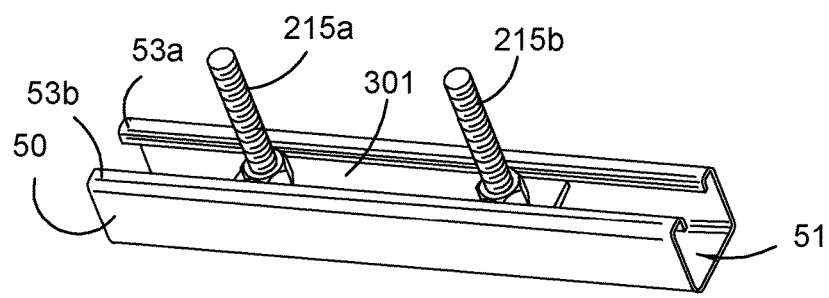
Figure 19C:
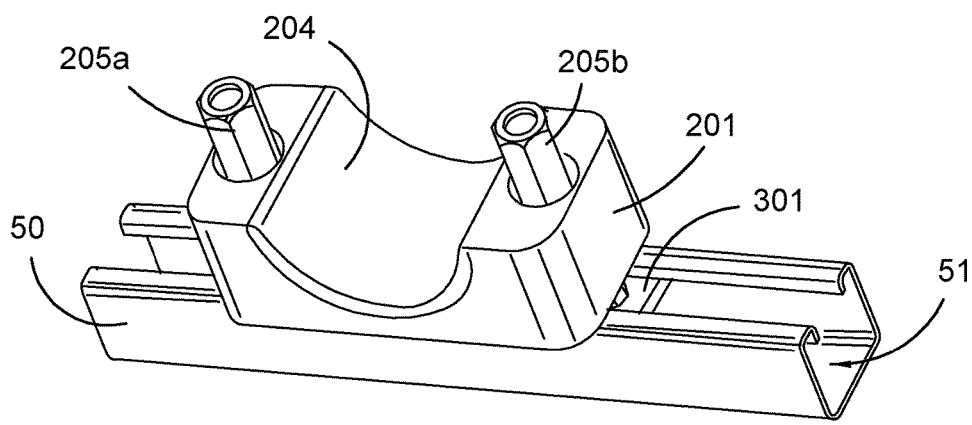
Figure 19D:
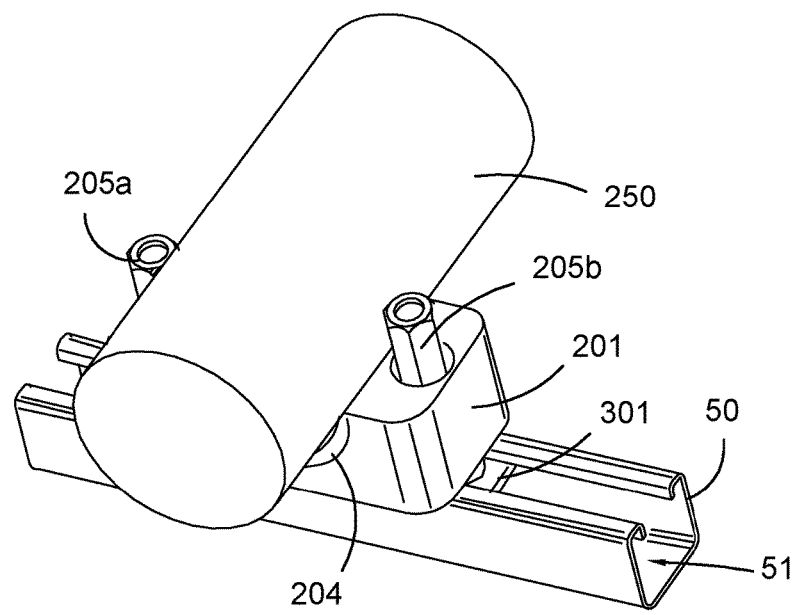
Figure 19E:
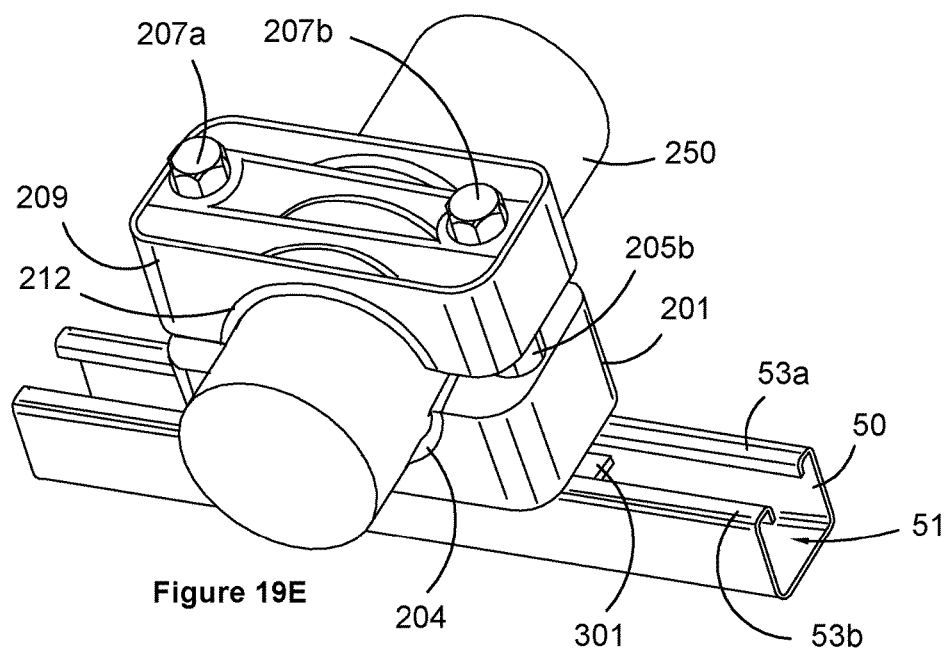
Figure 20:
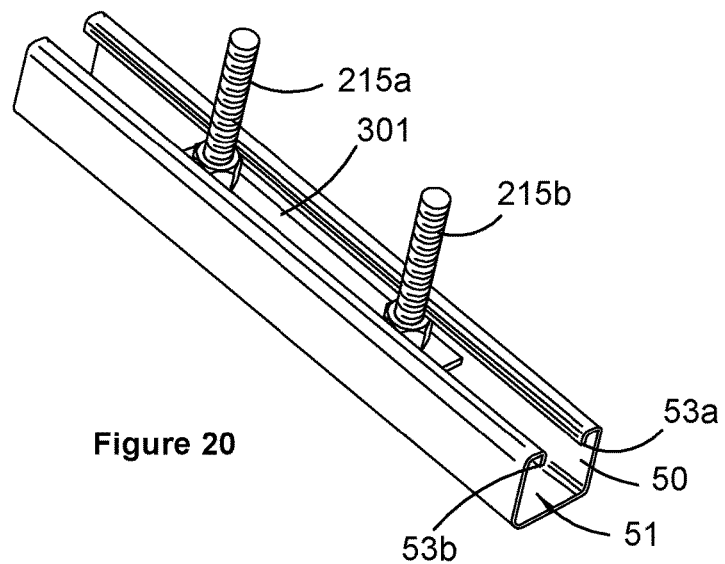
FIGS. 20, 21 and 22 depict perspective views of the arrangement of the cable clamp of FIG. 17A when in use where
Figure 21:
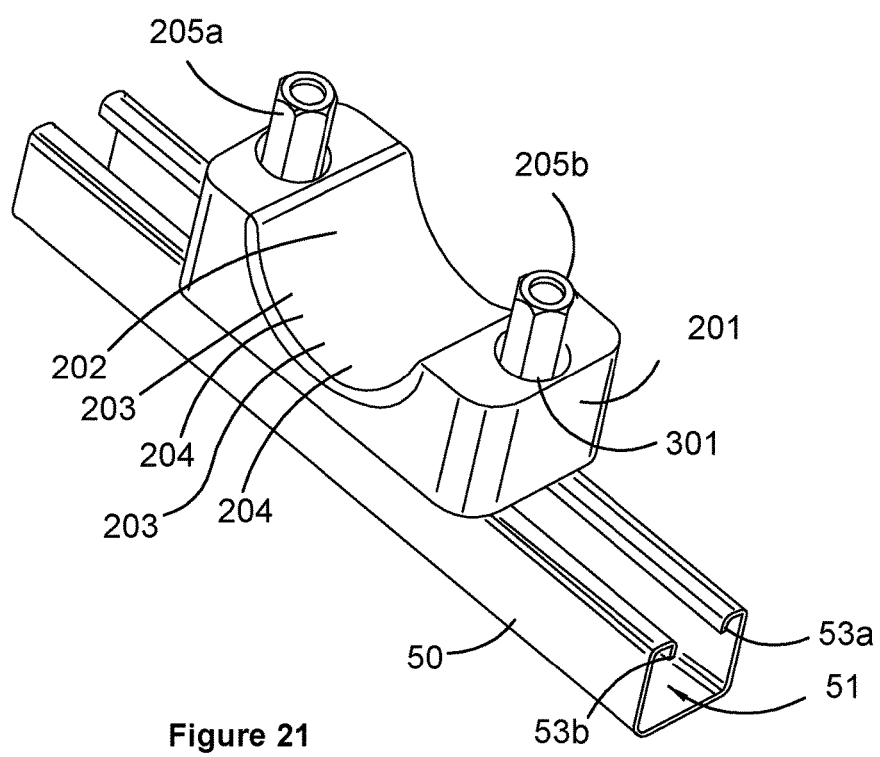
Figure 22:
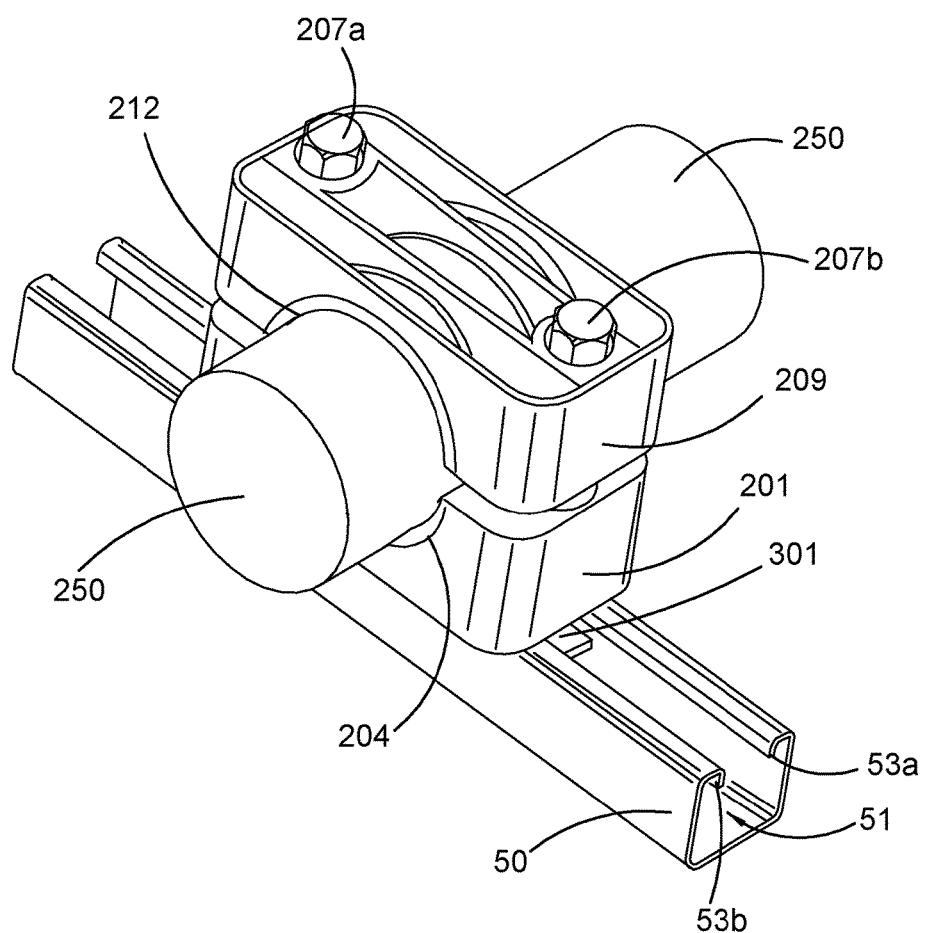
Figure 23:
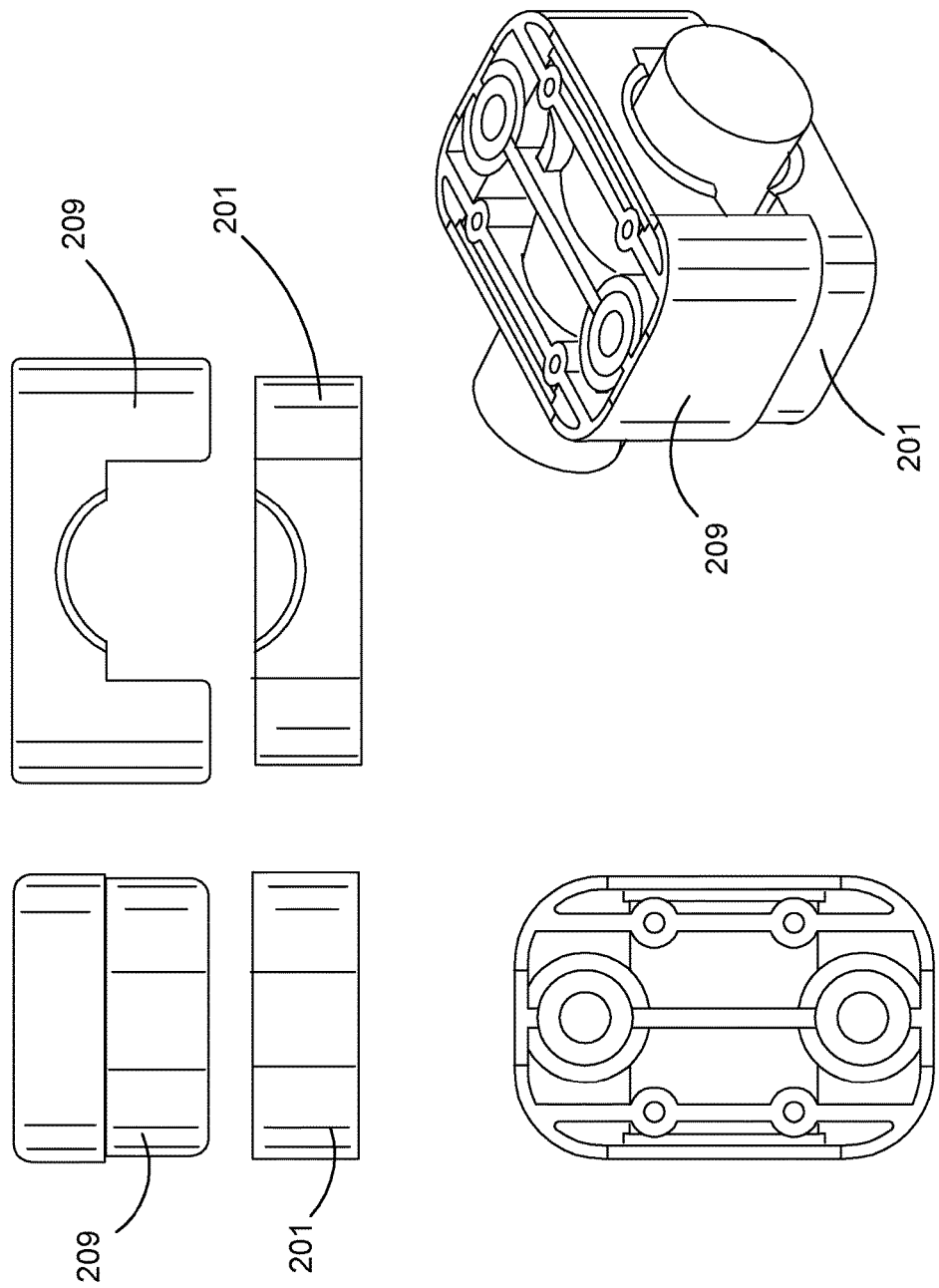
FIGS. 23 to 25 each depict side plan, top plan & perspective views of respective particular arrangements of the cable clamp as described herein.
Figure 24:
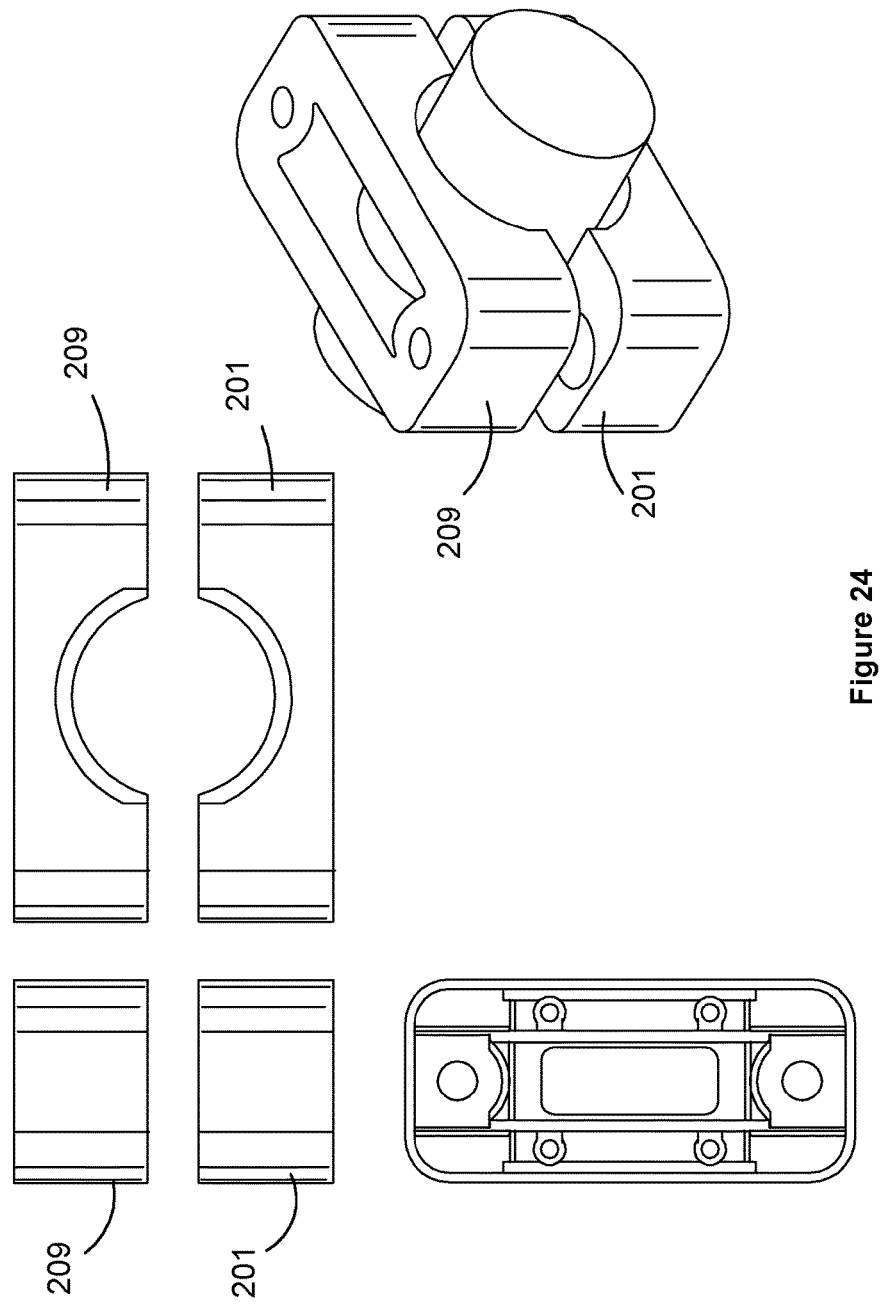
Figure 25:
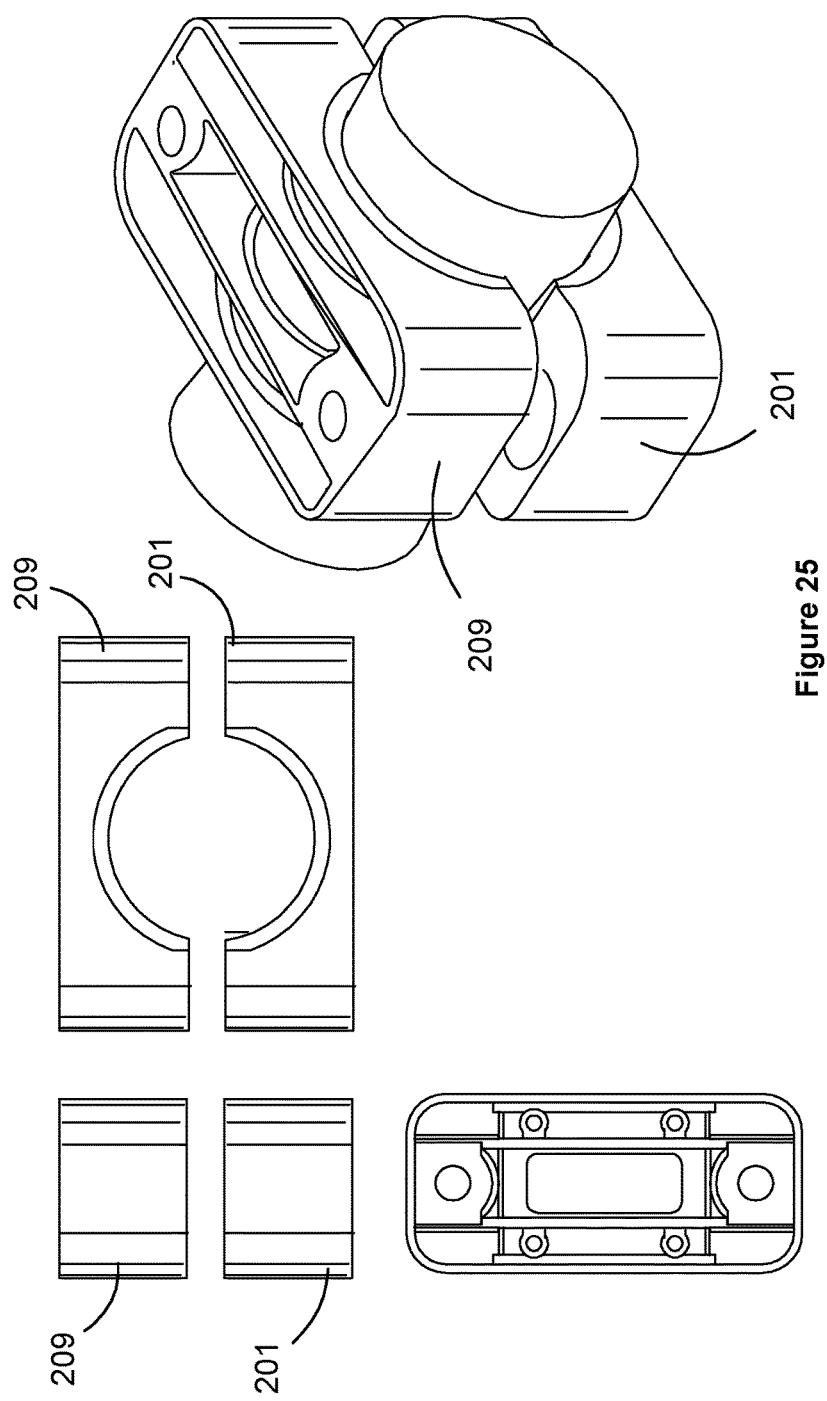

Referring now to FIGS. 19A to 19E, there is shown the assembly sequence for the cable clamp described above. In FIG. 19A, there is provided a busbar securing portion 300 comprising busbar engaging portion 301 and two attachment bolts 215*a* and 215*b* engaged therewith. In FIG. 19B, busbar engaging portion 301 is engaged with busbar 50. In FIG. 19B, first mating unit 201 is engaged with attachment bolts 215*a* and 215*b* and securing nuts 205*a* and 205*b* are screwed into attachment bolts 215*a* and 215*b* to secure the first mating unit 210 to the busbar 50. In FIG. 19D, cable 250 is located in cable locating formation 203 to engage with arcuate resilient sleeve 204 semi-permanently attached to said upper arcuate surface 202 of first mating unit 201. In FIG. 19E, second mating unit 209 is located such that arcuate resilient sleeve 212 of second mating unit 209 engages cable 250. Second mating unit 209 is then secured to the first mating unit 201 by securing bolts 207*a* and 207*b*, which engage with securing nuts 205*a* and 205*b*. Thus, cable 250 is secured between arcuate resilient sleeves 204 and 212 of first and second mating units 201 and 209 respectively. FIGS. 22 to 23 depict particular arrangements of the cable clamp as described above.

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

We claim:

1. A cable clamp adapted for clamping electrical cables, comprising: a busbar securing portion for securing the cable clamp to a busbar; a first mating unit comprising a first cable locating formation and at least two cavities adapted to receive at least two attachment bolts for attachment of the first mating unit to the busbar; at least two securing barrel nuts comprising a threaded portion for engaging the at least two respective attachment bolts and also for engaging at least two respective securing bolts; and a second mating unit comprising a second cable locating formation and at least two cavities adapted to align with the at least two cavities of the first mating unit, and further adapted to receive the at least two securing bolts, wherein, in use, the at least two securing bolts are screwed into the at least two securing nuts to secure the second mating unit to the first mating unit thereby to securely clamp an electrical cable located between respective first and second locating formations of the first and second mating units and to cause the attachment bolts to lift an engaging portion of the busbar securing portion until the engaging portion engages with the busbar thereby securing the first mating unit to the busbar.

2. A cable clamp as claimed in claim 1 wherein the busbar securing portion comprises:
   a busbar engaging portion comprising at least two apertures adapted to receive said at least two attachment bolts.

3. A cable clamp as claimed in claim 2 wherein the first mating unit further comprises
   an arcuate upper surface forming the first cable locating formation; and
   an arcuate resilient sleeve semi-permanently attached to said upper arcuate surface for engaging an electrical cable therewith.

4. A cable clamp as claimed in claim 3 wherein the second mating unit further comprises;
   an arcuate lower surface forming the second cable locating formation; and
   an arcuate resilient sleeve semi-permanently attached to said second cable locating formation for engaging an electrical cable therewith;
   wherein, in use, said upper arcuate surface and said lower arcuate surface of respective mating units are aligned and therefore secure an electrical cable therein.

5. A cable clamp as claimed in claim 4 further comprising at least two securing nuts comprising a threaded portion for engaging a respective one of said at least two attachment bolts and also a respective one of said at least two respective securing bolts.

6. A cable clamp as claimed in claim 5 wherein said at least two cavities of said first mating unit and said at least two cavities of said second mating unit are each further adapted to at least partially conceal a respective one of said at least two securing nuts.

7. A cable clamp as claimed in claim 6 wherein said at least partial concealment of said at least two securing nuts significantly minimises unwanted corona discharge associated with said electrical cable.

8. A cable clamp as claimed in claim 4 wherein said arcuate resilient sleeves are attached to a respective one of said first and second mating units by means of a series of posts on said sleeves, said posts adapted to mate with a corresponding series of cavities in said respective mating unit and forming a snug fit to respective cable locating formations of said first and second mating units.

9. A cable clamp as claimed in claim 1 wherein the first mating unit and the second mating unit are formed from a non-conducting material.

10. A cable clamp as claimed in claim 9 wherein the first mating unit and the second mating unit are formed from a plastics material.

11. A cable clamp as claimed in claim 9 wherein the first mating unit and the second mating unit are formed from a material having a high dielectric constant to assist in minimisation of unwanted corona discharge.

12. A cable clamp as claimed in claim 11 wherein the first mating unit and the second mating unit are formed via an injection moulding technique.

13. A cable clamp as claimed in claim 1 wherein the first mating unit and the second mating unit are substantially identical.

14. A cable clamp as claimed in claim 1 wherein the electrical cable is a high-voltage electrical cable.

15. A kit for a cable clamp for clamping electrical cables, the kit comprising: a busbar securing portion for securing the cable clamp to a busbar; at least two attachment bolts: a first mating unit comprising a first cable locating formation and at least two cavities adapted to receive the at least two attachment bolts for attachment of the busbar securing portion and the first mating unit to the busbar at least two securing barrel nuts comprising a threaded portion for engaging a respective one of said at least two attachment bolts thereby to secure the first mating unit and the busbar securing portion to the busbar; at least two securing bolts: a second mating unit comprising a second cable locating formation and at least two cavities adapted to align with the at least two cavities of the first mating unit, and further adapted to receive the at least two securing bolts wherein each of the at least two securing bolts is adapted to engage with said threaded portion of a respective one of said securing nuts thereby secure the second mating unit in cooperation to said first mating unit and thereby secure a cable located in engagement with said first and said second cable locating formations and to cause the attachment bolts to lift an engaging portion of the busbar securing portion until the engaging portion engages with the busbar thereby securing the first mating unit to the busbar.

16. A kit as claimed in claim 15 further comprising:
a first arcuate resilient sleeve semi-permanently attached to said first cable securing formation of said first mating unit for engaging an electrical cable therewith; and
second arcuate resilient sleeve semi-permanently attached to said second cable securing formation of said second mating unit for engaging an electrical cable therewith.

17. A kit as claimed in claim 15 wherein the first and the second mating units are substantially identical.

18. A cable clamp as claimed in claim 1 wherein each of the first and second mating units further include a soft sleeve for engaging the cable, said sleeves being at least semi permanently attached to a corresponding mating unit.

19. A cable clamp as claimed in claim 18 wherein said soft sleeves are attached by means of a series of posts mating with a corresponding series of cavities and forming a snug fit there to.

20. A cable clamp as claimed claim 19 wherein the series of posts are formed on the sleeve and the series of cavities are formed in the mating units.

* * * * *